(12) United States Patent
Lin

(10) Patent No.: US 8,320,058 B2
(45) Date of Patent: Nov. 27, 2012

(54) LENS ASSEMBLY

(75) Inventor: Mong-Tung Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 62 days.

(21) Appl. No.: 12/977,078

(22) Filed: Dec. 23, 2010

(65) Prior Publication Data

US 2012/0127597 A1    May 24, 2012

(30) Foreign Application Priority Data

Nov. 19, 2010   (TW) .............................. 99140040 A

(51) Int. Cl.
*G02B 9/00* (2006.01)
(52) U.S. Cl. ..................................................... 359/738
(58) Field of Classification Search .......... 359/738–740, 359/642
See application file for complete search history.

(56) References Cited

U.S. PATENT DOCUMENTS

| | | | |
|---|---|---|---|
| 4,452,516 A * | 6/1984 | Salia-Munoz | 351/45 |
| 4,989,960 A * | 2/1991 | Thomas | 359/738 |
| 6,898,026 B2 * | 5/2005 | Jewers et al. | 359/738 |
| 2002/0030898 A1 * | 3/2002 | Kouchiyama et al. | 359/738 |
| 2004/0057123 A1 * | 3/2004 | Magocs et al. | 359/738 |
| 2005/0036214 A1 * | 2/2005 | Jewers et al. | 359/738 |

FOREIGN PATENT DOCUMENTS

JP              05241111 A  *  9/1993

* cited by examiner

*Primary Examiner* — James Greece
(74) *Attorney, Agent, or Firm* — Altis Law Group, Inc.

(57) ABSTRACT

A lens assembly includes a first lens and a second lens. The first lens includes a first optically active part, a first optically inactive part surrounding the first optically active part, and a first annular protrusion formed on the first optically inactive part. The first annular protrusion defines an accommodating room. The second lens includes a second optically active part, a second optically inactive part surrounding the second optically active part, a second annular protrusion formed on the second optically inactive part, and a light blocking layer formed on a surface of the second annular protrusion facing the first lens. The second lens is coupled to the first lens in such a manner that the second annular protrusion is received in the accommodating room.

16 Claims, 4 Drawing Sheets

LENS ASSEMBLY

BACKGROUND

1. Technical Field

The present disclosure relates to a lens assembly.

2. Description of Related Art

Light blocking plates are used in lens modules to reduce flare. However, the plates add to the number of optical components in the lens module and complicate assembly of the lens module.

Therefore, it is desirable to provide a lens assembly, which can overcome the above-mentioned limitations.

DETAILED DESCRIPTION

Figure 1:
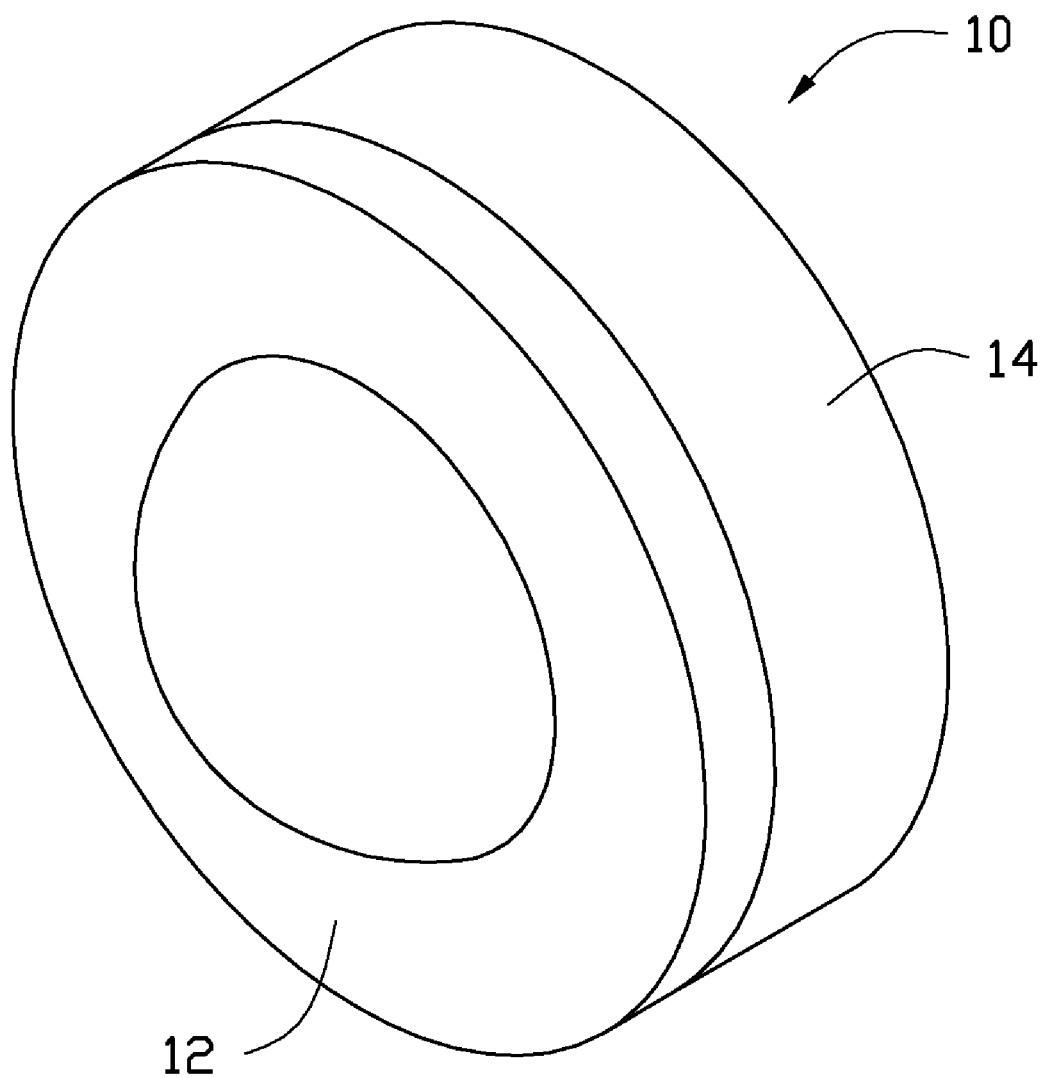
FIG. 1 is an isometric view of a lens assembly according to an embodiment.
Figure 2:
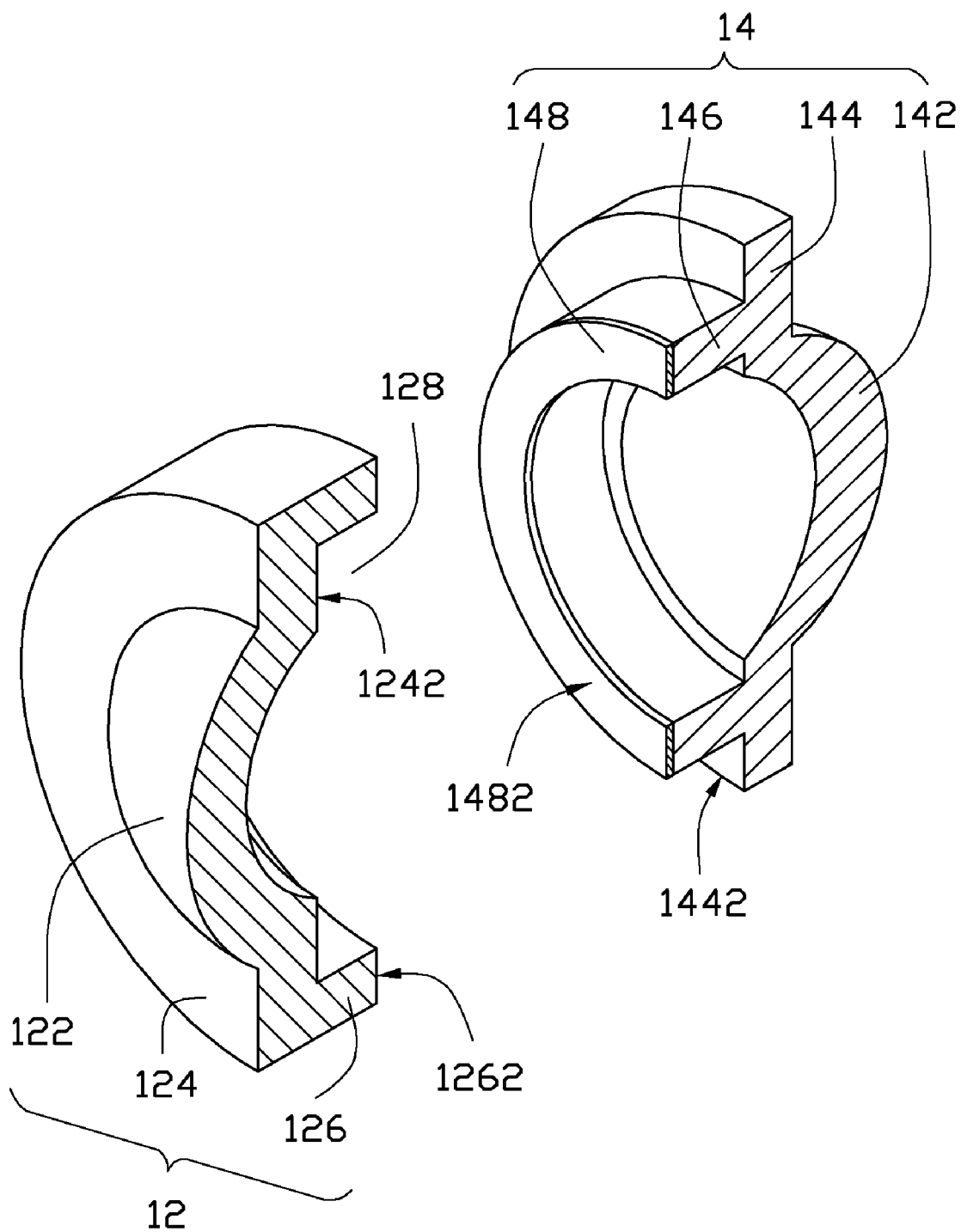
FIG. 2 is a cutaway, exploded view of the lens assembly of FIG. 1.
Figure 3:
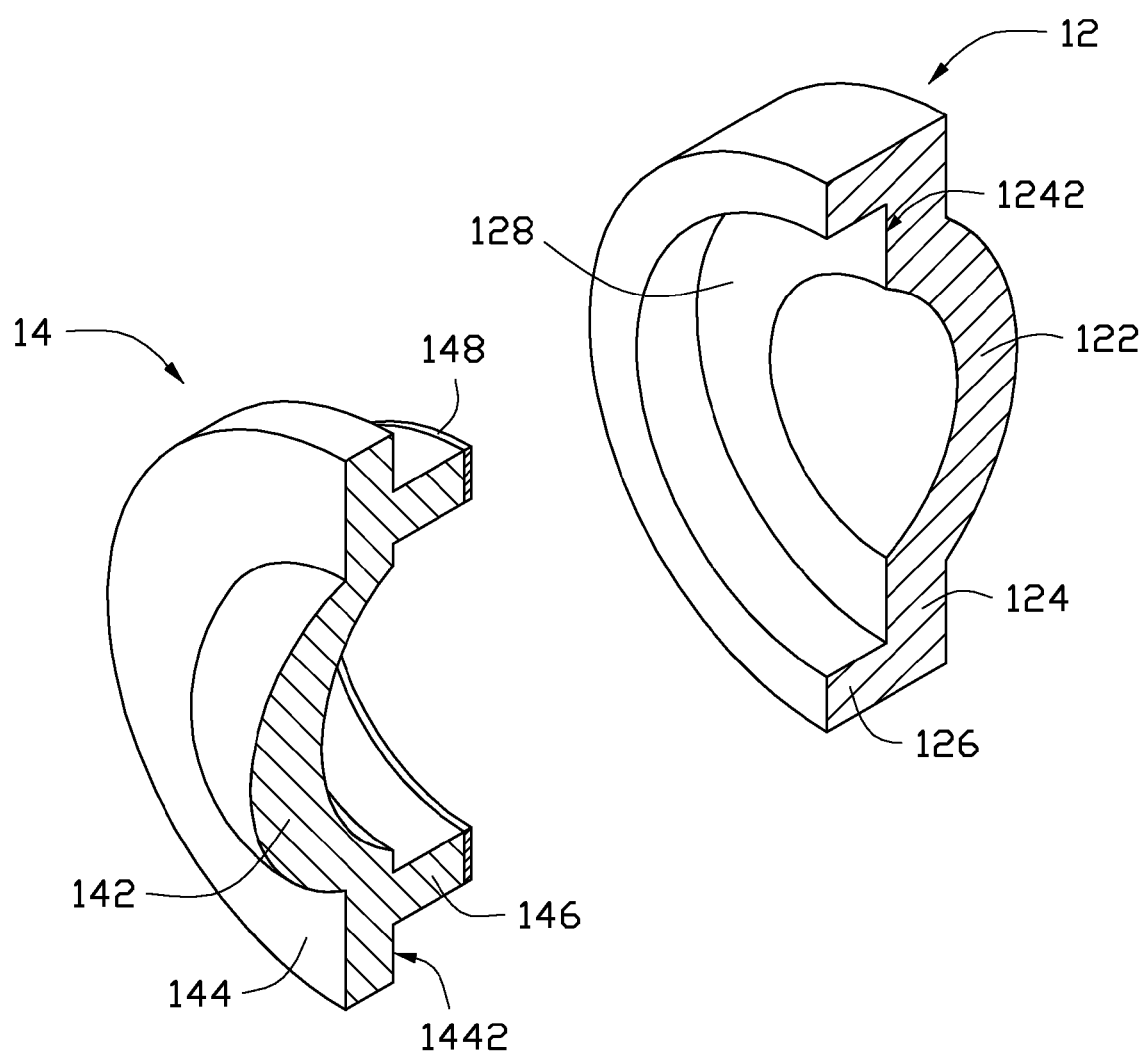
FIG. 3 is another cutaway exploded view of the lens assembly of FIG. 1 from another view angle.

Referring to FIGS. 1-3, a lens assembly 10 includes a first lens 12 and a second lens 14.

The first lens 12 includes a first optically active part 122, a first optically inactive part 124 surrounding the first optically active part 122, and a first annular protrusion 126. The first annular protrusion 126 is formed on a surface 1242 of the first optically active part 122 facing the second lens 14. The first annular protrusion 126 defines a substantially cylindrical accommodating space 128. The first optically active part 122 is for optical imaging. The first optically inactive part 124 and the first annular protrusion 126 couple with the second lens 14 to fix the first lens 12 relative to the second lens 14. The first optically active part 122 includes a spherical surface.

The second lens 14 includes a second optically active part 142, a second optically inactive part 144 surrounding the second optically active part 142, a second annular protrusion 146, and an annular light blocking layer 148. The second annular protrusion 146 is formed on a surface 1442 of the second optically inactive part 144 facing the first lens 12. The light blocking layer 148 is formed a surface of the second annular protrusion 146 facing the first lens 12. The second optically active part 142 is for optical imaging. The second optically inactive part 144 and the second annular protrusion 146 couple with the first lens 12. The second annular protrusion 146 engages with the first annular protrusion 126 in such a manner that the second annular protrusion 146 is received in the accommodating space 128. The light blocking layer 148 blocks light from the second optically inactive part 144 and the second annular protrusion 146, thus decreasing/avoiding flare. A thickness of the light blocking layer 148 is in a range from 1 micron to 100 microns. The light blocking layer 148 may be formed by inkjet printing. A material of the light blocking layer 148 can be any one or more of known black inks. The black inks include an amount of carbon black. The second optically inactive part 142 includes a spherical surface.

In the present embodiment, the inner surface of the first annular protrusion 126 is wholly in contact with the outer surface of the second annular protrusion 146. A surface 1262 of the first annular protrusion 126 facing the second lens 14 is wholly in contact with the surface 1442 of the second optically inactive part 144. A surface 1482 of the light blocking layer 148 facing the first lens 12 is wholly in contact with the surface 1242 of the first optically active part 124.

Figure 4:
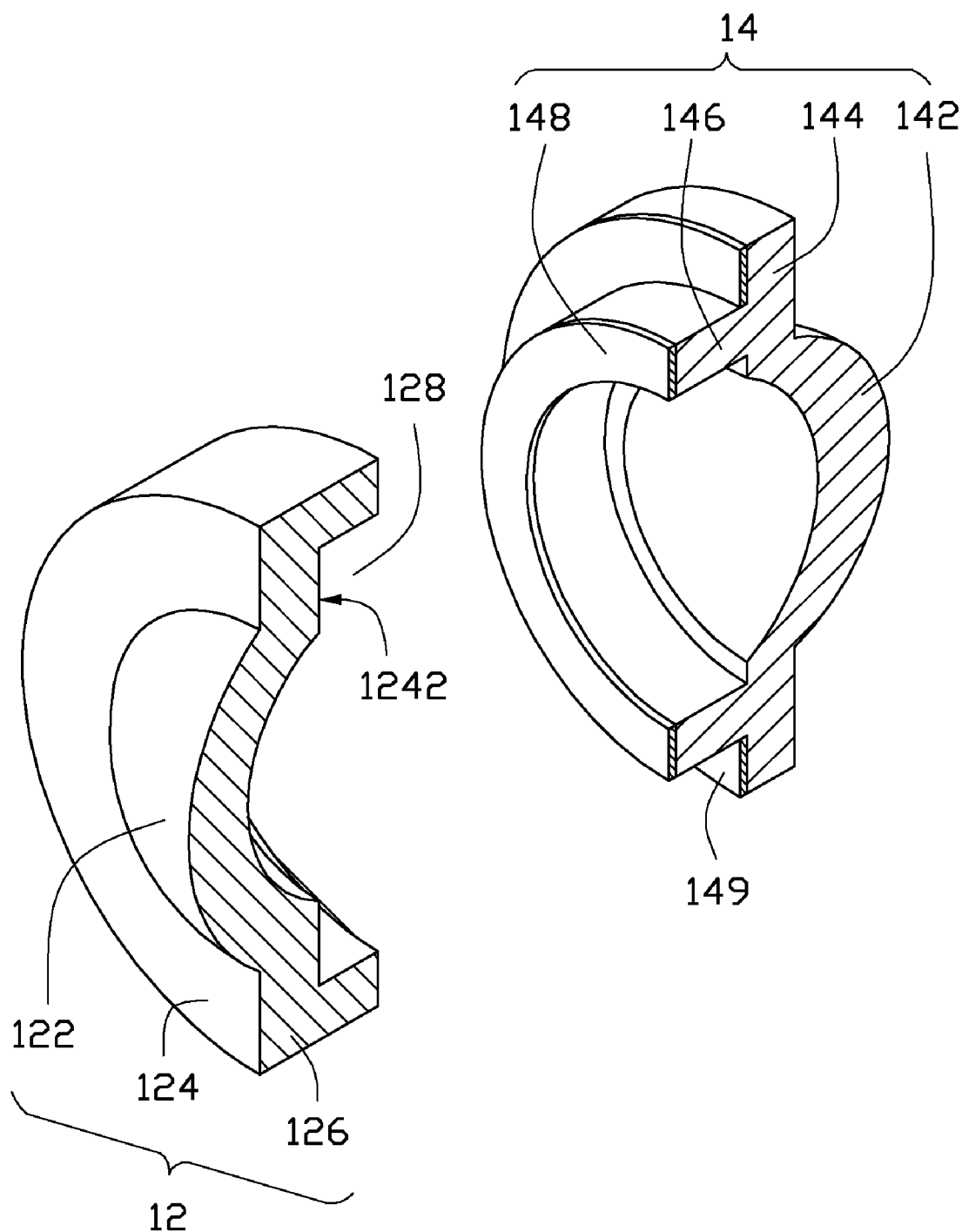
FIG. 4 is a cutaway exploded view of the lens assembly of FIG. 1, with a light blocking layer on a surface of a second optically inactive part.

It is noteworthy that in other embodiments, the second lens 14 may further include another annular light blocking layer 149 formed on the surface 1442, thus blocking light from passing through the second optically inactive part 144, as shown in FIG. 4.

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. A lens assembly comprising:
   a first lens comprising a first optically active part, a first optically inactive part surrounding the first optically active part, and a first annular protrusion formed on the first optically inactive part, the first annular protrusion defining an accommodating room;
   a second lens comprising a second optically active part, a second optically inactive part surrounding the second optically active part, a second annular protrusion formed on the second optically inactive part, and an annular light blocking layer formed on a surface of the second annular protrusion facing the first lens, the second annular protrusion being engaged in the first annular protrusion in such a manner that the second annular protrusion and the light blocking layer is received in the accommodating room to fix the first lens to the second lens.

2. The lens assembly of claim 1, wherein the second lens further comprises another annular light blocking layer formed on a surface of the second optically inactive part facing the first lens.

3. The lens assembly of claim 1, wherein a material of the light blocking layer is black ink.

4. The lens assembly of claim 1, wherein the black ink contains carbon black.

5. The lens assembly of claim 1, wherein a thickness of the light blocking layer is in approximate range from 1 micron to 100 microns.

6. The lens assembly of claim 1, wherein the first annular protrusion is formed on a surface of the first optically inactive part facing the second lens.

7. The lens assembly of claim 1, wherein the second annular protrusion is formed on a surface of the second optically inactive part facing the first lens.

8. The lens assembly of claim 1, wherein an inner surface of the first annular protrusion is in contact with an outer surface of the second annular protrusion.

9. The lens assembly of claim 1, wherein a surface of the first annular protrusion facing the second lens is in contact with a surface of the second optically inactive part facing the first lens.

10. The lens assembly of claim 1, wherein a surface of the light blocking layer facing the first lens is in contact with a surface of the first optically inactive part facing the second lens.

11. The lens assembly of claim 1, wherein the accommodating room is substantially cylindrical.

12. The lens assembly of claim 1, wherein the light blocking layer blocks light from the second optically inactive part and the second annular protrusion.

13. The lens assembly of claim 1, wherein the light blocking layer is formed by inkjet printing.

14. The lens assembly of claim 8, wherein the inner surface of the first annular protrusion is directly contact the outer surface of the second annular protrusion.

15. The lens assembly of claim 9, wherein the surface of the first annular protrusion facing the second lens is directly contact the surface of the second optically inactive part facing the first lens.

16. The lens assembly of claim 10, wherein the surface of the light blocking layer facing the first lens is directly contact with the surface of the first optically inactive part facing the second lens.

\* \* \* \* \*